(12) United States Patent
Maeda et al.

(10) Patent No.: US 7,695,068 B2
(45) Date of Patent: Apr. 13, 2010

(54) SEAT RECLINING APPARATUS FOR VEHICLE

(75) Inventors: Kenji Maeda, Kariya (JP); Toshiyuki Tanaka, Kariya (JP); Hiromi Okazaki, Hekinan (JP); Takuya Mizuno, Kariya (JP); Daisuke Ono, Toyota (JP); Eiji Mizutani, Kariya (JP)

(73) Assignees: Aisin Seiki Kabushiki Kaisha, Kariya-shi (JP); Toyota Boshoku Kabushiki Kaisha, Kariya-shi (JP); Toyota Shatai Kabushiki Kaisha, Kariya-shi (JP)

( * ) Notice: Subject to any disclaimer, the term of this patent is extended or adjusted under 35 U.S.C. 154(b) by 184 days.

(21) Appl. No.: 12/054,769

(22) Filed: Mar. 25, 2008

(65) Prior Publication Data

US 2008/0238172 A1    Oct. 2, 2008

(30) Foreign Application Priority Data

Mar. 29, 2007    (JP)    ............................. 2007-089484

(51) Int. Cl.
*B60N 2/02*    (2006.01)
(52) U.S. Cl. .............................. 297/362.11; 297/362.12
(58) Field of Classification Search ................. 297/362, 297/362.11, 361.1, 361.12
See application file for complete search history.

(56) References Cited

U.S. PATENT DOCUMENTS

| 5,447,360 | A * | 9/1995 | Hewko et al. .......... 297/452.18 |
| 6,318,806 | B1 * | 11/2001 | Levert et al. ................. 297/362 |
| 7,314,250 | B1 * | 1/2008 | Eblenkamp et al. ......... 297/362 |
| 2006/0006717 | A1 * | 1/2006 | Sakamoto ................. 297/361.1 |
| 2007/0200408 | A1 * | 8/2007 | Ohta et al. ............. 297/362.11 |

FOREIGN PATENT DOCUMENTS

JP    2-95304    4/1990

* cited by examiner

*Primary Examiner*—Sarah B McPartlin
(74) *Attorney, Agent, or Firm*—Oblon, Spivak, McClelland, Maier & Neustadt, L.L.P.

(57) ABSTRACT

A seat reclining apparatus for a vehicle includes first, second, and third gear mechanisms, each gear mechanism including a first frame having an internal gear and a second frame having an external gear engaging with the internal gear, the number of teeth of the external gear being fewer than the internal gear, wherein the first gear mechanism is provided at one side of a vehicle seat, and the second and third gear mechanisms are provided at the other side, a shaft connecting the first gear mechanism with the second and third gear mechanisms, and an electric motor rotating the shaft to shift an engagement position between the internal gear and the external gear for tilting the seatback relative to the seat cushion, wherein the electric motor is disposed at one of the first frame and the second frame of the first gear mechanism provided at the one side.

6 Claims, 7 Drawing Sheets

SEAT RECLINING APPARATUS FOR VEHICLE

CROSS REFERENCE TO RELATED APPLICATIONS

This application is based on and claims priority under 35 U.S.C §119 with respect to Japanese Patent Application 2007-089484, filed on Mar. 29, 2007, the entire content of which is incorporated herein by reference.

FIELD OF THE INVENTION

This invention relates to a seat reclining apparatus for a vehicle.

BACKGROUND

A seat equipped with a so-called three-point seatbelt (may be referred to as a seat with built-in seatbelt), into which a seatbelt and peripheral components are incorporated, is known as a vehicle seat. In this kind of vehicle seat, a manual seat reclining apparatus for a vehicle is employed for reclining the seatback relative to a seat cushion.

More specifically, the manual seat reclining apparatus for the vehicle includes a pair of upper frames and a pair of lower frames. Each upper frame has internal teeth and is mounted on the seatback. The lower frame is mounted on the seat cushion so that a pawl is attached so as to be movable in a radial direction. A cam provided around a center shaft is rotated by manual operation. Then, the internal teeth of the upper frame is engaged with the external teeth of the pawl to regulate the rotation of the upper frame relative to the lower frame, or the internal teeth of the upper frame is disengaged from the external teeth of the pawl to allow the rotation of the upper frame relative to the lower frame. Thus, the rotation of the seatback is regulated or allowed relative to the seat cushion, and the reclining angle of the seatback is adjusted or retained. It is confirmed that this type of seat reclining apparatuses withstand a large load applied to the seatback in vehicle collision or the like.

On the other hand, a seat reclining apparatus which is applicable to an electric vehicle seat includes a gear mechanism comprised of a lower frame and an upper frame. The lower frame has an internal gear and is attached to the seat cushion. The upper frame has an external gear engaging with the internal gear, and the number of the teeth in the external gear is fewer than that of the internal gear of the lower frame. The seat reclining apparatus is configured so that the rotation angle of the upper frame is successively adjusted relative to the lower frame by rotating a position where the external and internal gears are engaged (hereinafter, referred to as an engagement position). A combination of paired wedge shaped members and a cam member, interposed between the lower frame and the upper frame, is adopted as a mechanism for rotating the engaging position of the external and internal gears. The cam member is rotated by electric motor control. Then, the wedge shaped members are rotated while pressing the gears of the lower frame and the upper frame in a direction that enhances the engagement therebetween, thereby rotating the engagement position.

Data shows that the gear mechanisms provided at this type of vehicle seat reclining apparatuses are unable to withstand the large load applied to the seatback in the vehicle collision and the like. Thus, according to an embodiment of a seat reclining apparatus for a vehicle disclosed in JP 2-95304A, it is proposed that two gear mechanisms are soldered back to back so that the gear mechanisms are disposed in a mirror-image arrangement for enhancing the strength of the seat reclining apparatus.

Hence, the two gear mechanisms described above are disposed at one side of the seat relative to the seat width direction where the load applied to the seatback become large. In other words, the two gear mechanisms are located at the side where the supporting point of the seatbelt supporting the occupant shoulder is located. Further, one gear mechanism is disposed at the other side of the seat relative to the seat width direction. This configuration allows the seat reclining apparatus for the vehicle to secure the sufficient strength while preventing the size of the apparatus from becoming larger.

Meanwhile, in this type of seat reclining apparatus for the vehicle, when an electric motor is disposed thereat for rotating the engagement position of the gear mechanism (cam member), the electric motor may extend in the seat width direction and the form of the vehicle seat becomes imbalance. Consequently, the seating position of the occupant may be away from the center of the seat, leading to discomfort while sitting on the vehicle seat.

A need exists for a seat reclining apparatus for a vehicle which is not susceptible to the drawback mentioned above.

SUMMARY OF THE INVENTION

According to an aspect of the present invention, a seat reclining apparatus for a vehicle includes first, second and third gear mechanisms, each gear mechanism including a first frame mounted at one of a seat cushion and a seatback and having an internal gear, and a second frame mounted at the other one of the seat cushion and the seatback and having an external gear engaging with the internal gear, the number of teeth of the external gear being fewer than the internal gear, wherein the first gear mechanism is provided at one side of a vehicle seat relative to a seat width direction, and the second and third gear mechanisms are provided at the other side of the vehicle seat relative to the seat width direction, a shaft operatively connecting the first gear mechanism provided at the one side with the second and third gear mechanisms provided at the other side, and an electric motor rotating the shaft to shift an engagement position between the internal gear and the external gear for tilting the seatback relative to the seat cushion, wherein the electric motor is disposed at one of the first frame and the second frame of the first gear mechanism provided at the one side relative to the seat width direction.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
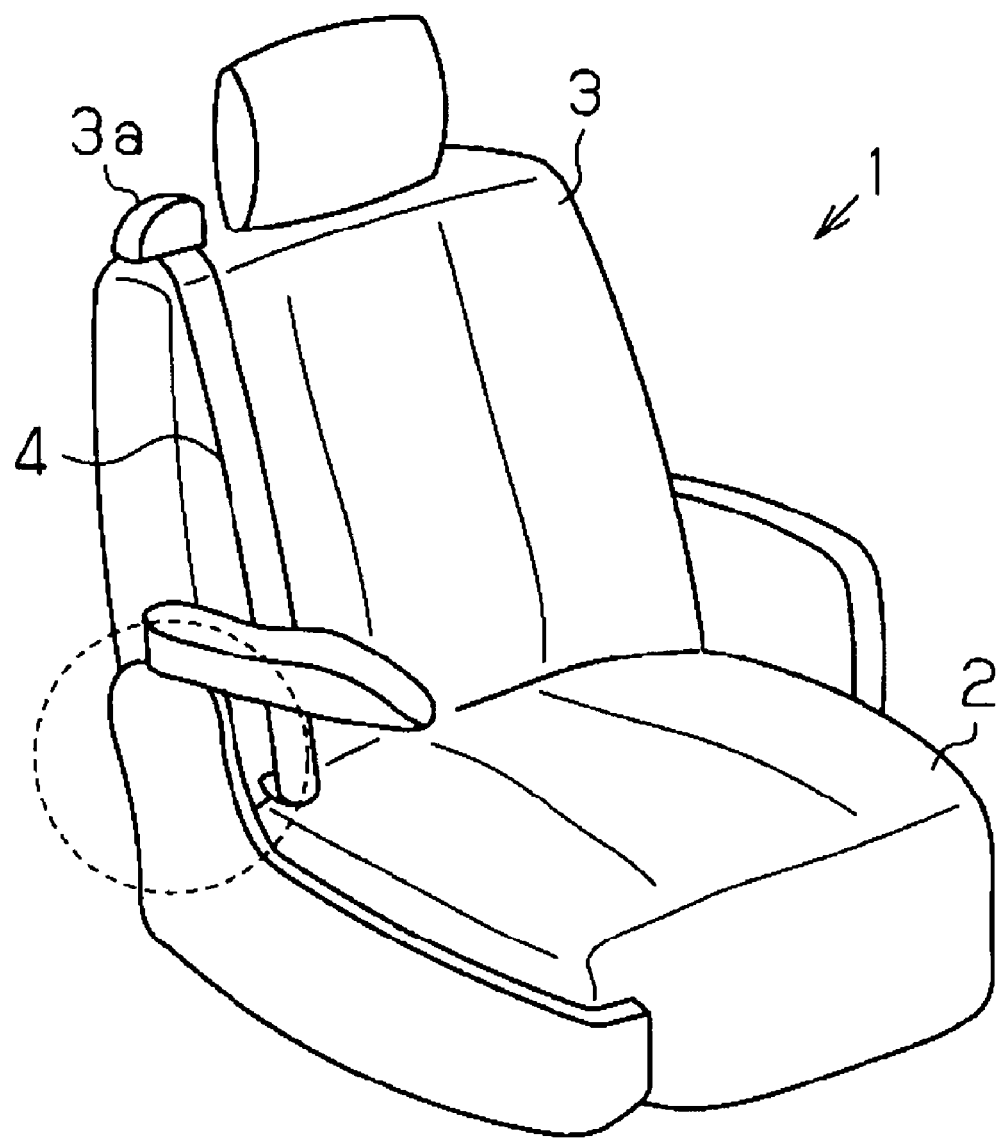
FIG. 1 is a perspective view showing a vehicle seat to which an embodiment of the invention is applied.

Hereinafter, an embodiment of the invention, in which the invention is applied to a vehicle seat mounted on a vehicle such as an automobile, will be described with reference to drawings. FIG. 1 is a perspective view showing a vehicle seat 1 of the embodiment. As shown in FIG. 1, a seatback 3 is supported by a seat cushion 2 mounted on a vehicle floor at a rear end portion of the seat cushion 2. A supporting point 3a (so-called shoulder anchorage) of a seatbelt 4 is mounted on a shoulder portion of the seatback 3. More specifically, the supporting point 3a is located at a right side of the shoulder portion of the seatback 3 relative to a seat width direction when viewed from an occupant being seated on the seat cushion 2. The vehicle seat 1 supports the occupant with the seat belt 4 pulling out from the supporting point 3a at three points, which are located at left and right sides of the occupant's waist and a right shoulder portion. Namely, the vehicle seat 1 is a seat equipped with a so-called three-point seatbelt (seat with built-in seatbelt) in which the three-point seatbelt and the peripheral components are incorporated.

In the embodiment, the supporting point 3a supporting the right shoulder of the occupant is located on an outer side of the vehicle, facing to a vehicle body such as a vehicle door. Obviously, a larger load is applied to the seatback 3 in the vehicle collision on the side where the supporting point 3a is located, i.e. the right side of the vehicle seat relative to the seat width direction.

Figure 2:
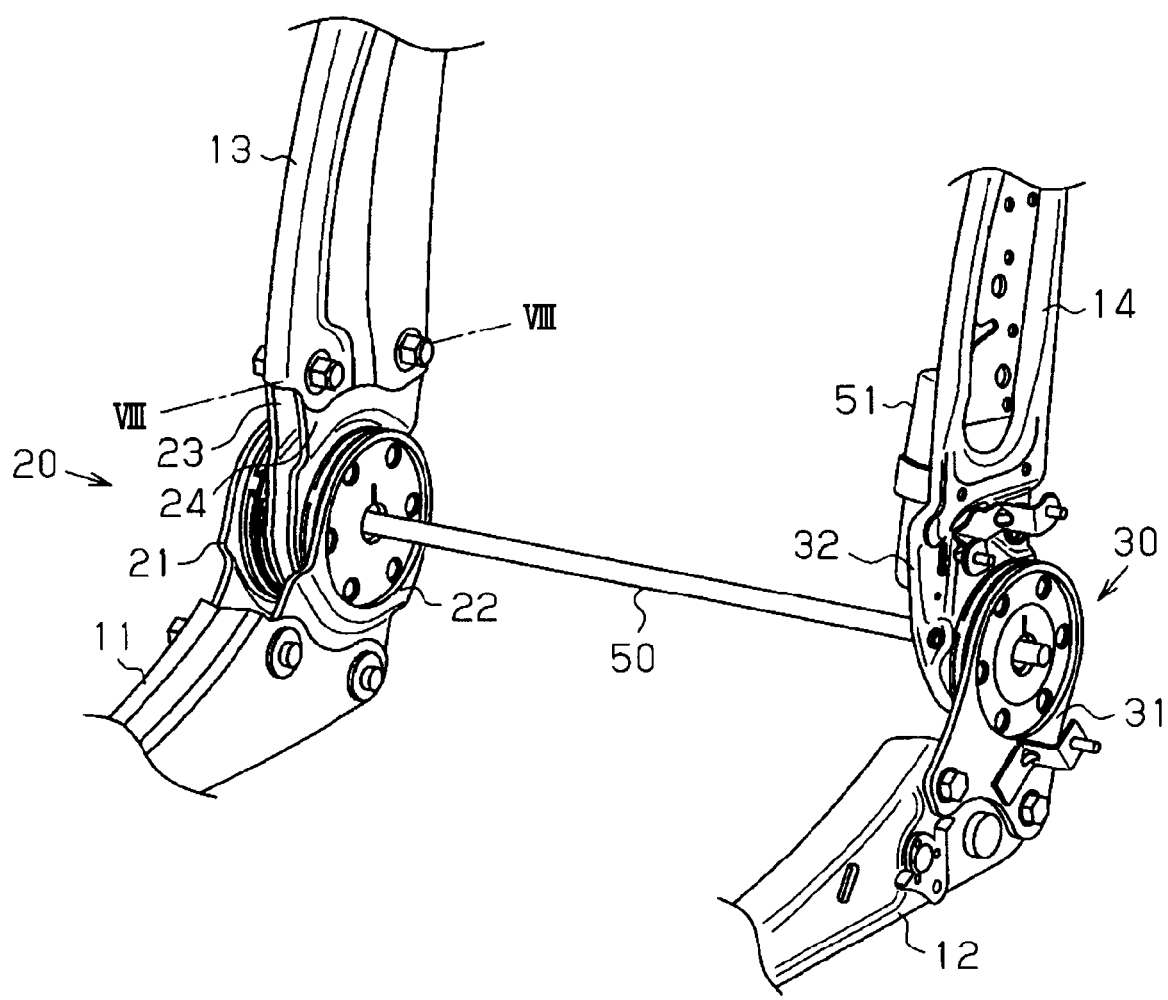
FIG. 2 is a perspective view showing a frame of the vehicle seat.

FIG. 2 is a perspective view showing a framework of the vehicle seat 1 of the embodiment. As shown in FIG. 2, a pair of seat cushion frames 11 and 12, each arranged at a side relative to the seat width direction, is made of metal plates which form a framework of the seat cushion 2. Also, a pair of seatback frames 13 and 14 is made of metal plates which form a framework of the seatback 3. The seatback frame 13 is rotatably connected to the seat cushion frame 11 via a reclining mechanism 20, and the seatback frame 14 is rotatably connected to the seat cushion frame 12 via a reclining mechanism 30. The seatback frames 13 and 14 tilt forward and backward relative to the seat cushion frames 11 and 12.

Figure 3:
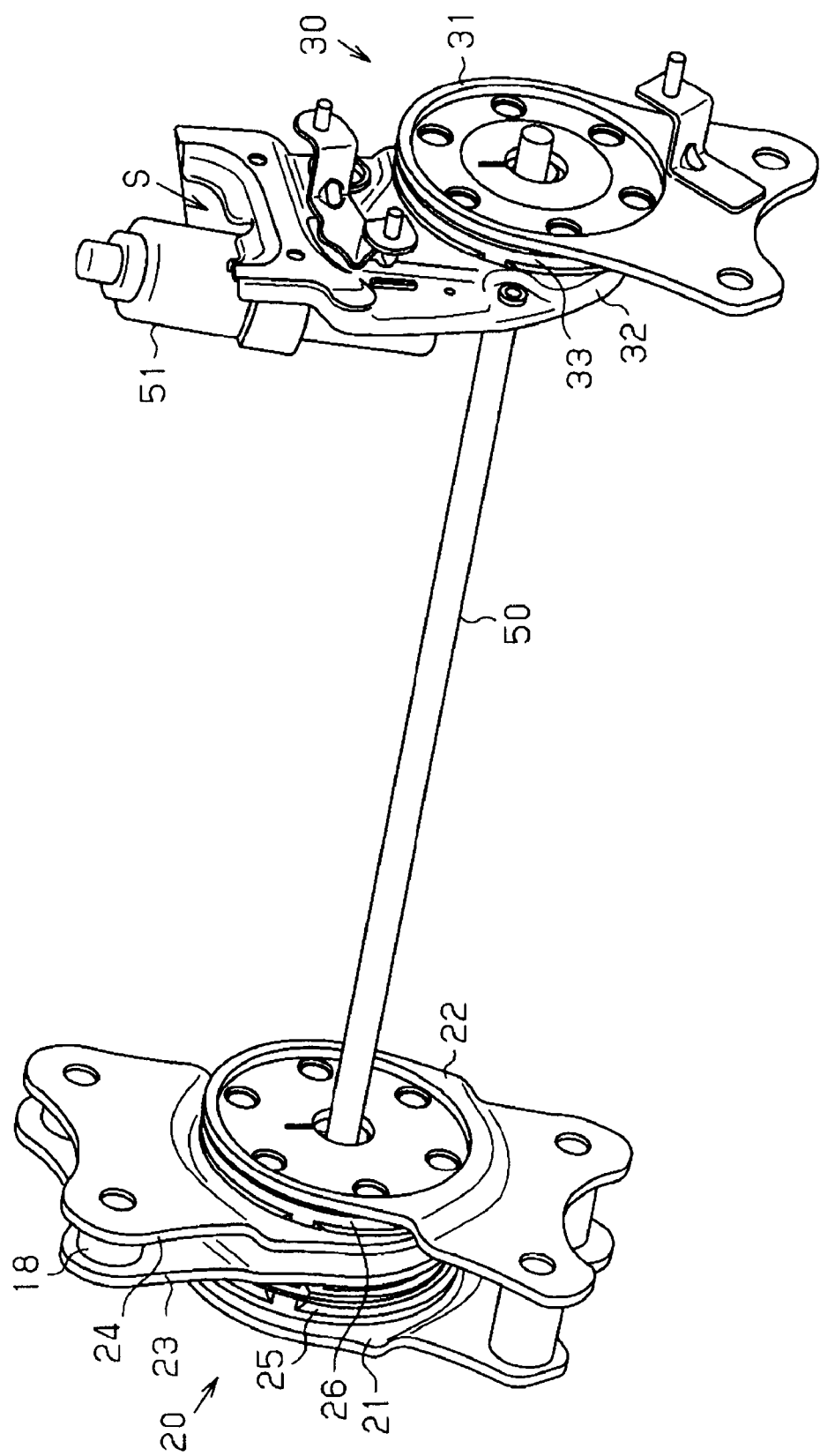
FIG. 3 is a perspective view showing the embodiment.
Figure 4:
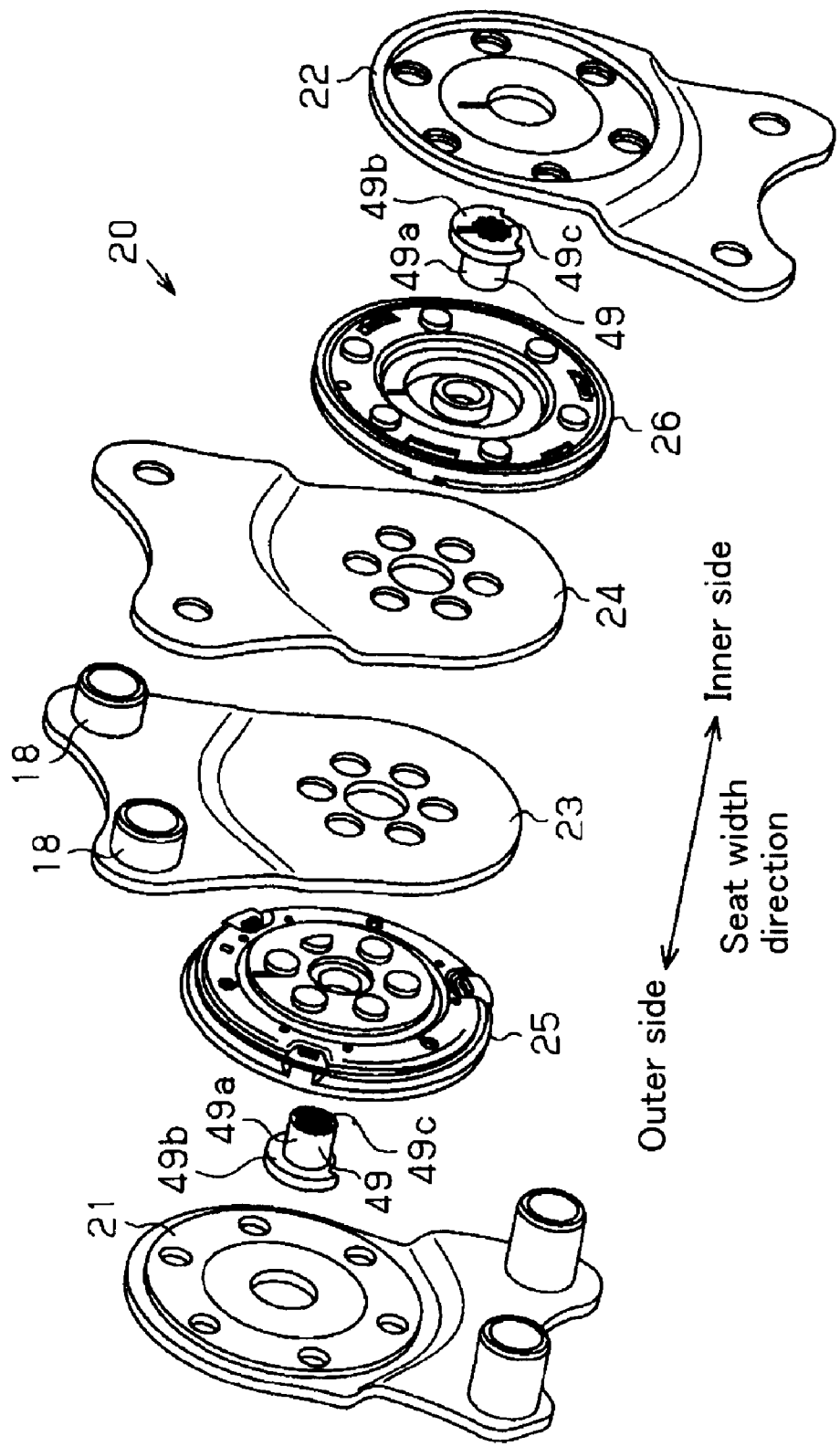
FIG. 4 is an exploded perspective view showing one reclining mechanism of the embodiment.

More specifically, as shown in a perspective view of FIG. 3 and an exploded perspective view of FIG. 4, the reclining mechanism 20 is located at the right side (left side in FIG. 3) relative to the seat width direction when viewed from the occupant. The reclining mechanism 20 includes a pair of lower arms 21 and 22 which are made of metal plates and fastened to the seat cushion frame 11. The reclining mechanism 20 further includes a pair of upper arms 23 and 24 which is made of metal plates and fastened to the seatback frame 13, and the pair of the upper arms 23 and 24 is interposed between the lower arm 21 and the lower arm 22. Furthermore, a gear mechanism 25 (second gear mechanism) is held between the lower arm 21 and the upper arm 23 and a gear mechanism 26 (third gear mechanism) is held between the lower arm 22 and the upper arm 24. The lower arms 21 and 22, the upper arms 23 and 24, and the gear mechanisms 25 and 26 are respectively paired and each pair has identical structures. One element of each pair is located at a left side (outer side) in FIG. 4 and the other element of each pair is located at a right side (inner side) in FIG. 4. The pair of the lower arms 21 and 22, the pair of the upper arms 23 and 24, and the pair of the gear mechanisms 25 and 26 are arranged so that the back surfaces of the elements in each pair face each other. A double structure described above is adopted for reducing the load applied to each gear mechanism 25, 26. As stated above, especially prominent in the seat equipped with the seatbelt, the load, applied to the seatback 3 via the shoulder anchorage 3a in the vehicle frontal collision, becomes larger on the outer side of the vehicle. Hence, in the double structure, the load applied to the reclining mechanism 20, located on the outer side of the vehicle, is distributed through the two gear mechanisms 25 and 26 to reduce the amount of the load applied thereto. This configuration allows the reclining mechanism 20 to withstand the large load.

Figure 5:
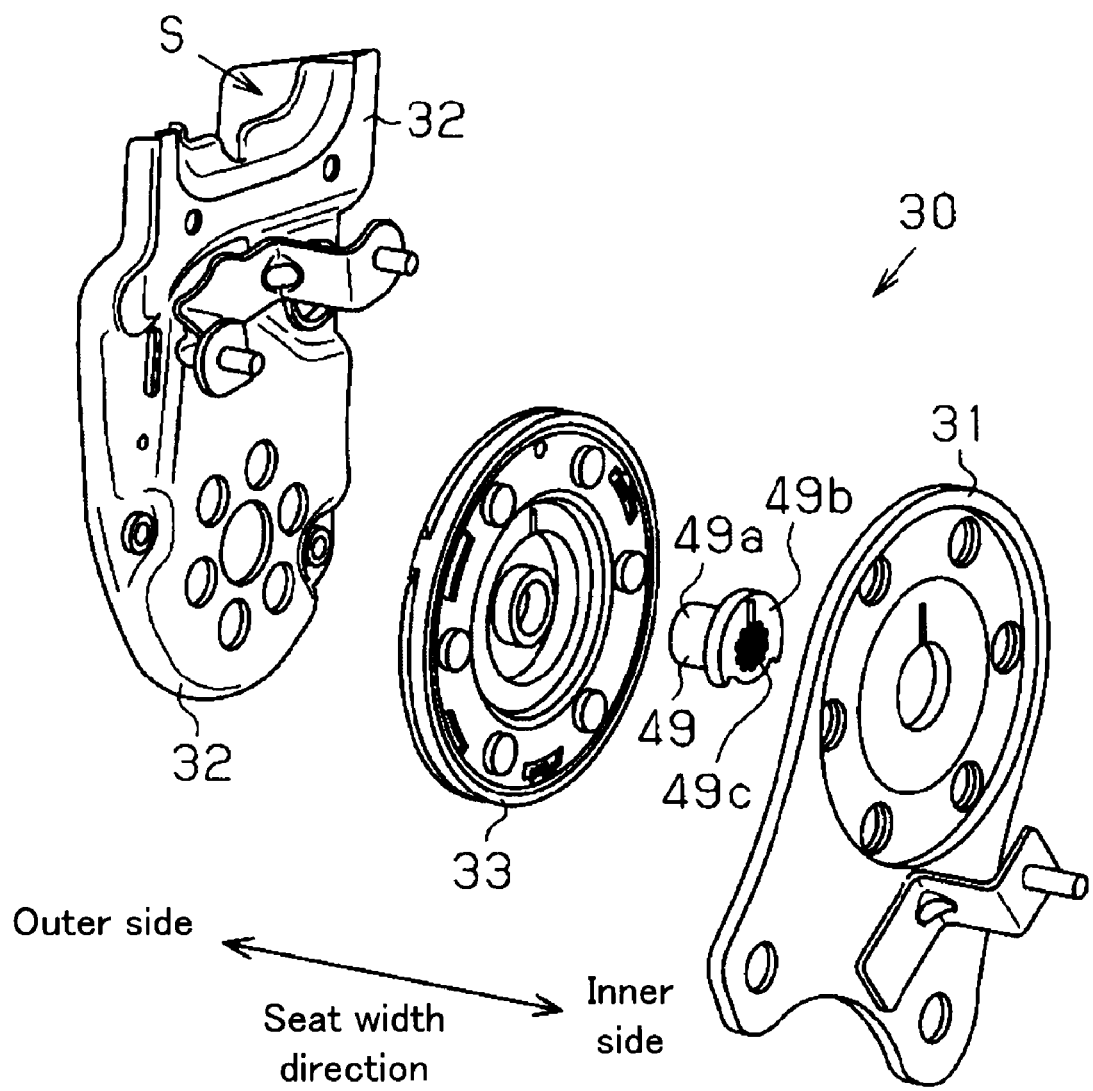
FIG. 5 is an exploded perspective view showing the other reclining mechanism of the embodiment.

On the other hand, as shown in the perspective view of FIG. 3 and an exploded perspective view of FIG. 5, the other reclining mechanism 30 is located at a left side of the vehicle seat (right side in FIG. 3) relative to the seat width direction when viewed from the occupant. The reclining mechanism 30 is provided with a lower arm 31 made of a metal plate, and the lower arm 31 is fastened to the seat cushion frame 12. The reclining mechanism 30 is further provided with an upper arm 32 made of a metal plate, and the upper arm 32 is fastened to the seatback frame 14. Further, a gear mechanism 33 (first gear mechanism) is held between the lower arm 31 and the upper arm 32.

Figure 6:
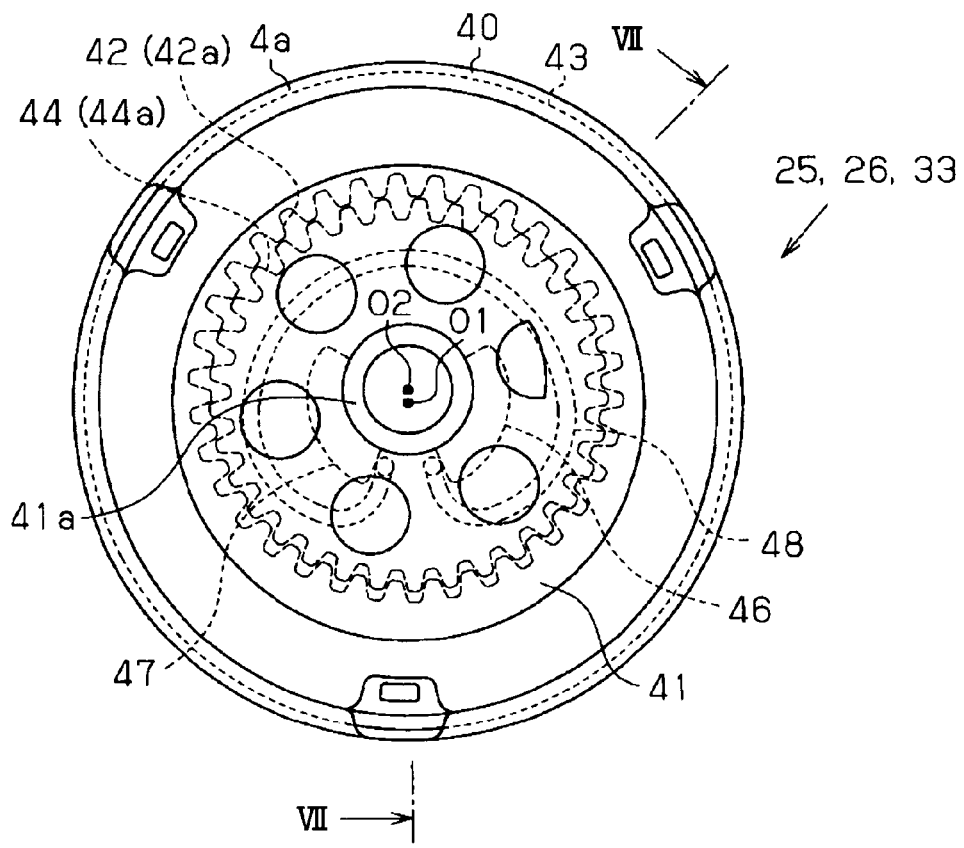
FIG. 6 is a side view showing a gear mechanism.
Figure 7:
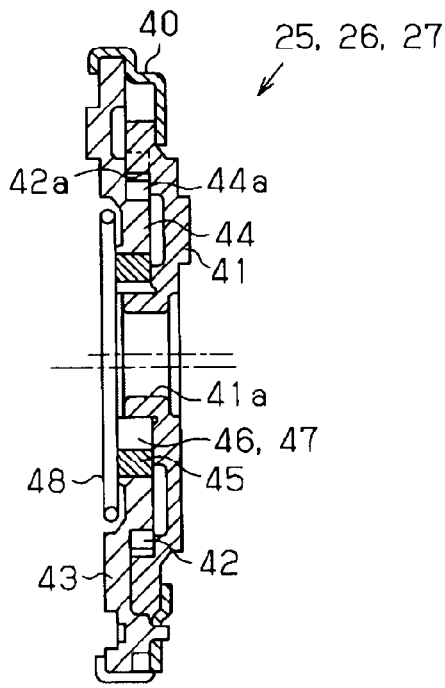
FIG. 7 is a sectional view taken along line VII-VII of FIG. 5.

Next, gear mechanisms 25, 26, and 33 are described with reference to FIGS. 6 and 7. FIG. 6 is a side view showing the gear mechanisms 25, 26, and 33, and FIG. 7 is a sectional view taken along line VII-VII of FIG. 6. In the embodiment, the gear mechanisms 25, 26, and 33 have an identical configuration, thus the description of the gear mechanism 25 will represent the configurations of the gear mechanisms 25, 26, and 33. The other gear mechanisms 26 and 33 are configured in a similar way and the above description will be used for the gear mechanisms 26 and 33 by replacing the lower arms and the upper arms. For example, when describing the gear mechanism 26, the lower arm 21 is replaced with the lower arm 22 and the upper arm 23 is replaced with the upper arm 24. Similarly, when describing the gear mechanism 33, the lower arm 21 is replaced with the lower arm 31 and the upper arm 23 is replaced with the upper arm 32.

An upper plate 41 secured on an outer surface of the upper arm 23 is formed by half blanking a metal plate, and a recessed portion 42 is circularly recessed from an outer surface of the upper plate 41. The recessed portion 42 is formed with an internal gear 42a. An annular bearing 41a is coaxially formed at a center portion of the recessed portion 42. The annular bearing 41a protrudes outwardly and the center portion of the annular bearing 41a is open. The upper plate 41 comprises a first frame with the upper arm 23 and is assembled on the seatback frame 13 so as to be substantially integrated therewith.

A lower plate 43 secured on an inner surface of the lower arm 21 is formed by half blanking a metal plate, and an annular portion 44 is annularly formed. The annular portion 44 has an outer diameter which is smaller than an inner diameter of the recessed portion 42 and protrudes inwardly (to the side of the upper plate 41). The annular portion 44 is formed with an external gear 44a. Further, an annular bearing ring 45, having an outer diameter which has substantially identical size to an inner diameter of the annular portion 44, is press-fitted into the annular portion 44. The inner diameter of the bearing ring 45 is determined so as to be larger than the outer diameter of the annular bearing 41a. The lower plate 43 comprises a second frame with the lower arm 21 and is assembled on the seat cushion frame 11 so as to be substantially integrated therewith.

Here, the number of the teeth of the internal gear 42a is greater than that of the external gear 44a by a predetermined number (one tooth), and the shapes of the teeth of the internal gear 42a is formed so as to engage with the external gear 44a. As shown in FIG. 6, a central axis 01 of the internal gear 42a and a central axis 02 of the external gear 44a are eccentrically arranged relative to each other. Thus, the internal gear 42a and the external gear 44a rotate relative to each other while maintaining the engagement therewith. Namely, when the engagement position is shifted, every time the shaft 50 rotates, the upper plate 41 rotates relative to the lower plate 43 at an angle corresponding to a difference in the number of the teeth.

A ring shaped holder 40, made of a metal plate, is attached on outer peripheral portions of the lower and upper plates 43 and 41 in the condition that the lower plate 43 is mounted to the upper plate 41. The upper and lower plates 41 and 43 are axially held in a manner that the holder 40 allows the foregoing engagement position to shift.

The internal gear 42a and the external gear 44a are eccentrically engaged. An annular space is defined between an inner circumference of the bearing ring 45 and an outer circumference of the annular bearing 41a by the engagement between the internal gear 42a and the external gear 44a. A pair of wedge shaped pieces 46 and 47, divided in a circumferential direction of each gear mechanism, is attached at the annular space in accordance with an angular position of the engagement between the internal gear 42a and the external gear 44a.

The wedge shaped pieces 46 and 47 are respectively formed in a minor arc shape to fit with a shape of the space defined between the inner circumference of the bearing ring 45 and the outer circumference of the annular bearing 41a, and the wedge shaped pieces 46 and 47 are symmetrical to each other. The wedge shaped pieces 46 and 47 are gradually widen along a radial direction toward a circumferential end of each gear mechanism, and the circumferential end corresponds to the side where the internal gear 42a and the external gear 44a are engaged. A Ω shaped spring 48 is located at outer peripheral sides of the wedge shaped pieces 46 and 47. One end of the Ω shaped spring 48 is held at the wedge shaped piece 46 and the other end of the Ω shaped spring 48 is held at the wedge shaped piece 47. Consequently, the wedge shaped pieces 46 and 47 are pushed to be spread outward by the Ω shaped spring 48. In other words, the wedge shaped pieces 46 and 47 are biased in a direction that increases eccentricity of the internal gear 42a and the external gear 44a. Hence, the wedge shaped pieces 46 and 47 retains the engagement position of the internal gear 42a and the external gear 44a.

As shown in FIG. 4, a cam 49 is inserted into the annular bearing 41a of the upper plate 41 from the outer side and is formed with an axial portion 49a which is formed in a cylindrical shape. The axial portion 49a has an outer diameter which has substantially identical size to an inner diameter of the annular bearing 41a. The cam 49 is rotatably supported by the upper plate 41 at the axial portion 49a. Further, the cam 49 is provided with an arc shaped cam portion 49b which radially extends in an outward direction at one side of the axial portion 49a with respect to the axial direction (left side in FIG. 4). The cam portion 49b extends in an opposite angular direction from the engagement position of the internal gear 42a and the external gear 44a. The cam portion 49b is disposed between the pair of the wedge shaped pieces 46 and 47 having a clearance in the circumferential direction.

In the configuration described above, when the cam 49 rotates, either one of the wedge shaped pieces 46 and 47 is pressed by the cam portion 49b in accordance with the rotational direction of the cam 49. Then, the wedge shaped pieces 46 and 47 are unitarily rotated with the cam 49 while elastically deforming the Ω shaped spring 48. Consequently, the engagement position of the internal gear 42a and the external gear 44a is shifted, and the upper plate 41 rotates relative to the lower plate 43.

As shown in FIGS. 4 and 5, the cam 49 is disposed at each gear mechanism 26, 33 in a similar manner. A serration portion 49c axially penetrates through each cam 49. A shaft 50, composed of a metal rod shown in FIG. 3, is fitted into the serration portion 49c of each cam 49 through serration in the same phase, thereby rotating the cams 49 integrally with the shaft 50. In the respective gear mechanisms 25, 26 and 33, the lower plate 43 (lower arms 21, 22, 31) simultaneously rotates with the upper plate 41 (upper arms 23, 24, 32). Consequently, the reclining angles of the respective seatback frames 13 and 14 are successively adjusted relative to the respective seat cushion frames 11 and 12. Further, when the rotation of the shaft 50 is halted, the engagement position of the internal gear 42a and the external gear 44a is retained in each gear mechanism 25, 26, 33. Thus, the reclining angles of the seatback frames 13 and 14 are respectively retained relative to the seat cushion frames 11 and 12.

Each gear mechanism 25, 26, 33, and each lower and upper arm 21, 22, 31, 23, 24, 32, which are integrally operated with the corresponding gear mechanism 25, 26, 33, substantially comprises a single gear mechanism as a whole.

Figure 8:
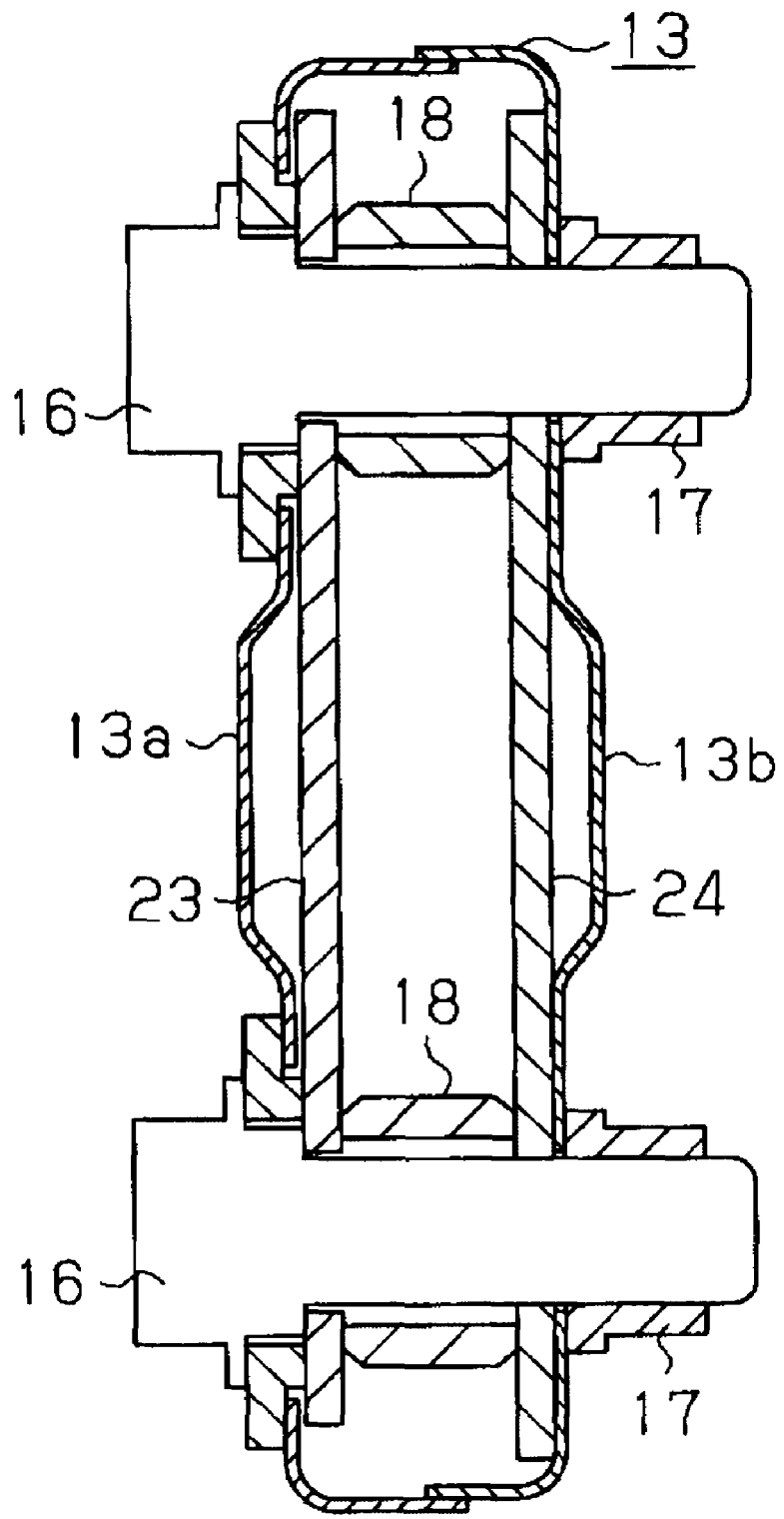
FIG. 8 is a sectional view taken along line VIII-VIII of FIG. 2.

As shown in a sectional view taken along line II-II in FIG. 8, the seatback frame 13, attached to the upper arms 23 and 24 of the reclining mechanism 20 shown in FIG. 2, presents a rectangular closed section form. A pair of frame portions 13a and 13b is bent to be formed in a U shape and is soldered in a manner that the openings of the frame portions 13a and 13b face each other to form the rectangular closed section. The above-described design of the seatback frame 13 is meant to withstand the load applied to the seatback frame 13 in the vehicle collision. Since the larger load is applied to the seatback frame 13 located on the outer side of the vehicle, compared to the seatback frame 14 located on the inner side of the vehicle, the seatback frame 13 requires higher strength.

The upper arms 23 and 24 are enclosed in the rectangular closed section and secured to the seatback frame 13 by tightening nuts 17. Each nut 17 is threaded into a threaded portion of a bolt 16. Each bolt 16 penetrates through the seatback frame 13 (the frame portions 13a and 13b), and the threaded portion of the bolt 16 protrudes outwardly. A bush 18, into which each bolt 16 is inserted between the upper arms 23 and 24, prevents the nut 17 from being tightened excessively.

As shown in FIG. 3, an electric motor 51, driving a shaft 50 to rotate, is fixed at the upper arm 32 of the reclining mechanism 30 on the inner side relative to the seat width direction. The rotation is transmitted by a worm gear between the shaft 50 and the electric motor 51. The worm gear is constructed between a rotational shaft of the electric motor 51 and the shaft 50. As shown in FIG. 5, the upper arm 32 is bent so as to be formed in a U shape which opens to the inner side relative to the seat width direction for securing the strength and defines a space S in the inner side relative to the seat width direction. A part of the electric motor 51 is housed in the space S, thereby being disposed in a compact manner.

As described above, according to the embodiment, the below benefits will be obtained.

(1) According to the embodiment, the shaft 50 is driven to rotate by the electric motor 51. This rotation of the shaft 50 is transmitted to each gear mechanism 25, 26, 33, and then the engagement position of the internal gear 42a and the external gear 44a is shifted in each gear mechanism 25, 26, 33. The rotation angle of the lower plate 43 relative to the upper plate 41, i.e. the reclining angle of the seatback (seatback frames 13 and 14) relative to the seat cushion (seat cushion frames 11 and 12) is successively adjusted by shifting the engagement position of the internal gear 42a and the external gear 44a. In this configuration, the gear mechanisms 25 and 26 are disposed at the other side of the vehicle seat 1 (left side in FIG. 3) relative to the seat width direction for securing the sufficient strength. Accordingly, the other side of the vehicle seat 1, where the two gear mechanisms 25 and 26 are disposed, extends in the seat width direction for the two gear mechanisms. On the other hand, the gear mechanism 33 is disposed at the one side of the vehicle seat 1 (right side in FIG. 3) relative to the seat width direction, and thus the one side of the vehicle seat 1 is prevented from extending in the seat width direction. However, the electric motor 51 is disposed at the one side and the one side extends in the seat width direction for the electric motor 51. Hence, the vehicle seat 1 evenly extends in the seat width direction at the both side thereof, thereby preventing the imbalance form of the vehicle seat 1. Therefore, the configuration allows the occupant to be seated on the center of the vehicle seat 1 and restrains the discomfort caused by the imbalance of the vehicle seat 1.

(2) In the embodiment, the electric motor 51 is disposed at the inner side relative to the seat width direction of the reclining mechanism 30 (upper arm 32). Namely, the electric motor 51 is disposed at an interior portion of the vehicle seat 1 and does not expose to an exterior portion. Therefore, the design property of the seat reclining apparatus for the vehicle is improved.

(3) In the embodiment, the electric motor 51 is housed in the space S formed at the upper arm 32 for securing the strength of the upper arm 32. Accordingly, the electric motor 51 is disposed in the compact manner. Further, if the electric motor 51 is housed in the space S, spaces defined between the frames are not easily bent or deformed in the vehicle collision. Therefore, the strength of the upper arm 32 is readily secured.

(4) In the embodiment, the gear mechanisms 25, 26 and 33, having identical configurations, are employed, thereby reducing the item numbers of the components. Further, the double structure, having the two gear mechanisms 25 and 26, is employed for securing the strength of the reclining mechanism 20. Hence, it is not necessary to newly provide a single gear mechanism (reclining mechanism) having high strength in the seat reclining apparatus.

(5) In the embodiment, the reclining angle of the seatback (seatback frames 13 and 14) relative to the seat cushion (seat cushion frames 11 and 12) may be steplessly adjusted by electric motor control.

(6) In the embodiment, the seatback frame 13 located at the outer side of the vehicle, where the load applied to the seatback 3 tends to be larger in the vehicle collision and the like, is formed in the closed section form having the high strength, thereby securing the sufficient strength.

(7) In the embodiment, the vehicle seat 1 is the seat equipped with the seatbelt, in which the seatbelt is incorporated thereinto, and the right side of the vehicle seat relative to the seat width direction corresponds to the side where the supporting point 3a of the seatbelt 4, supporting the occupant's shoulder, is located. In the seat equipped with the seatbelt, the imbalance is more likely to occur prominently at the attempt to secure the frame strength. Thus, the effect obtained by the technology of the invention is further enhanced by fixing the electric motor 51 to the upper arm 32 located at the right side (one side) of the vehicle seat 1 relative to the seat width direction.

The embodiment may be modified as below. In the embodiment, the electric motor 51 may be secured to the lower arm 31. In the embodiment, the upper arms 23, 24 and 32, and the upper plate 41, comprising the first frame, may be mounted on the seat cushion frames 11 and 12, and the lower arms 21, 22, and 31 and the lower plate 43, comprising the second frame, may be mounted on the seatback frames 13 and 14. In this configuration, the electric motor 51 may be fixed to either one of the lower arm 31 and the upper arm 32.

In the embodiment, the upper arms 23 and 24 are interposed between the lower arms 21 and 22 in a manner that the back surfaces of the upper arms 23 and 24 face each other. However, the lower arms 21 and 22 may be interposed between the upper arms 23 and 24 in a manner that the back surfaces of the lower arms 21 and 22 face each other.

In the embodiment, the electric motor 51 may be disposed at the outer side of the reclining mechanism 30 (upper arm 32) relative to the seat width direction. As described above, in the vehicle seat 1 serving as the seat equipped with the three-point belt, the side where the supporting point 3a of the seatbelt 4 supporting the occupant's shoulder is located, i.e. the side where the two gear mechanisms 25 and 26 are disposed for securing the sufficient strength, is located on the outer side of the vehicle facing the vehicle body such as the vehicle door. On the other hand, the electrical motor 51 is disposed at the inner side of the vehicle corresponding to the reclining mechanism 30 (upper arm 32), and avoids extending to the outer side of the vehicle. Therefore, a limited space between the vehicle body and the vehicle seat may be effectively utilized.

Even in the form described above, the electric motor 51 should be disposed at the interior portion of the vehicle seat 1. For example, the electric motor 51 may be covered by a seat cover of the vehicle seat 1. In the embodiment, the lower arms 21, 22 and 31 may be integrally formed with the lower plates 43 of the corresponding gear mechanisms 25, 26 and 33. Similarly, the upper arms 23, 24 and 32 may be integrally formed with the upper plates 41 of the corresponding gear mechanisms 25, 26 and 33.

In the embodiment, the number of the teeth of the internal gear 42a may be larger than the number of the teeth of the external gear 44a by two teeth.

In the embodiment, the cams 49, used for pressing the wedge shaped pieces 46 and 47, may be integrally formed with the shaft 50.

In the embodiment, connection portions of the shaft 50, connecting the shaft 50 with each cam 49, and connection portions of the shaft 50, connecting the shaft 50 with the electric motor 51, may be separately formed from the shaft 50 as long as the shaft 50 and each cum 49 are integrally rotated by the electric motor 51. In the embodiment, the seat reclining apparatus of the invention is employed to be used in the seat equipped with the three-point seatbelt (seat with built-in seatbelt). However, the implementation of the invention is not limited to the above-described form. For example, the technology of the invention may be applied to ordinary vehicle seats when intentionally forming the vehicle seat in a left and right asymmetrical shape for securing the strength at a rear portion of the seatback.

According to the embodiment, the shaft 50 is driven to rotate by the electric motor 51. This rotation of the shaft 50 is transmitted to each gear mechanism 25, 26, 33 located at both sides of the vehicle seat 1 relative to the seat width direction, and then the engagement position of the internal gear 42a and the external gear 44a is shifted in each gear mechanism 25, 26, 33. The rotation angle of the second frame relative to the first frame, i.e. the reclining angle of the seatback relative to the seat cushion is successively adjusted. In this configuration, the other side of the vehicle seat 1, where the two gear mechanisms 25 and 26 are disposed for securing the strength, extends in the seat width direction for the two gear mechanisms. On the other hand, the gear mechanism 33 is disposed at the one side of the vehicle seat 1 (right side in FIG. 3) relative to the seat width direction, and thus the one side of the vehicle seat 1 is prevented from extending in the seat width direction. However, the electric motor 51 is disposed at the one side and the one side extends in the seat width direction for the electric motor 51. Hence, the vehicle seat 1 evenly extends in the seat width direction at the both side thereof, thereby preventing the imbalance form. Therefore, the configuration allows the occupant to be seated on the center of the vehicle seat 1 and restrains the discomfort caused by the imbalance of the vehicle seat 1.

According to the embodiment, the electric motor 51 is disposed at the interior portion of the vehicle seat 1. Thus, the electric motor 51 does not expose to the exterior portion. Therefore, the design property of the seat reclining apparatus for the vehicle is improved.

According to the embodiment, the electric motor 51 is housed in the space defined by the second frame. In the embodiment, the electric motor 51 is housed in the space S formed at the upper arm 32 for securing the strength of the upper arm 32. Accordingly, the electric motor 51 is disposed in the compact manner. Further, if the electric motor 51 is housed in the space S, the spaces defined between the frames are not easily bent or deformed in the vehicle collision. Therefore, the strength of the upper arm 32 is readily secured.

According to the embodiment, the vehicle seat 1 is the seat equipped with belt, which incorporates the seatbelt 4 thereinto, the one side of the vehicle seat 1 relative to the seat width direction is located at the side where the supporting point 3a of the seatbelt 4, supporting the occupant's shoulder, is located.

In the configuration, in the seat equipped with the seatbelt, the imbalance is more likely to occur prominently at the attempt to secure the frame strength. Thus, the effect obtained by the technology of the invention is further enhanced by fixing the electric motor 51 to the upper arm 32 located at the right side (one side) of the vehicle seat 1 relative to the seat width direction.

According to the embodiment, the seat reclining apparatus for the vehicle, preventing the vehicle seat from being formed in the imbalance shape and concurrently securing the sufficient strength, is provided.

The principles, of the preferred embodiments and mode of operation of the present invention have been described in the foregoing specification. However, the invention, which is intended to be protected, is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat reclining apparatus for a vehicle, comprising:
   first, second, and third gear mechanisms, each gear mechanism including:
      a first frame mounted at one of a seat cushion and a seatback and having an internal gear; and
      a second frame mounted at the other one of the seat cushion and the seatback and having an external gear engaging with the internal gear, the number of teeth of the external gear being fewer than the internal gear, wherein the first gear mechanism is provided at one side of a vehicle seat relative to a seat width direction, and the second and third gear mechanisms are provided at the other side of the vehicle seat relative to the seat width direction;
   a shaft operatively connecting the first gear mechanism provided at the one side with the second and third gear mechanisms provided at the other side; and
   an electric motor rotating the shaft to shift an engagement position between the internal gear and the external gear for tilting the seatback relative to the seat cushion, wherein the electric motor is disposed at one of the first frame and the second frame of the first gear mechanism provided at the one side relative to the seat width direction.

2. A seat reclining apparatus for a vehicle according to claim 1, wherein the electric motor is disposed at an interior portion of the vehicle seat.

3. A seat reclining apparatus for a vehicle according to claim 1, wherein the electric motor is housed in a space defined by the first frame.

4. A seat reclining apparatus for a vehicle according to claim 1, wherein the vehicle seat is a seat equipped with a seatbelt, in which the seatbelt is incorporated thereinto, and the other side of the vehicle seat relative to the seat width direction is located at a side where a supporting point of the seatbelt, supporting an occupant's shoulder, is located.

5. A seat reclining apparatus for a vehicle according to claim 1, wherein the second and third gear mechanisms are arranged in parallel in the seat width direction.

6. A seat reclining apparatus for a vehicle according to claim 3, wherein the first frame includes an upper arm which is bent to be formed in a U shape so as to open to an inner side relative to the seat width direction, and the upper arm defines the space in the inner side relative to the seat width direction.

* * * * *